(12) United States Patent
Hildebrand

(10) Patent No.: US 8,382,047 B1
(45) Date of Patent: Feb. 26, 2013

(54) MULTI-USE CLAMPING DEVICE

(76) Inventor: Shawn Eric Hildebrand, Chicora, PA (US)

( * ) Notice: Subject to any disclaimer, the term of this patent is extended or adjusted under 35 U.S.C. 154(b) by 633 days.

(21) Appl. No.: 12/378,087

(22) Filed: Feb. 12, 2009

(51) Int. Cl.
*A62C 13/76* (2006.01)

(52) U.S. Cl. ............... 248/79; 269/3; 269/6; 248/316.4

(58) Field of Classification Search ............ 248/75, 248/79, 689, 311.2, 316.4, 316.6, 313, 229.22, 248/229.24; 220/737, 694; 269/3, 6
See application file for complete search history.

(56) References Cited

U.S. PATENT DOCUMENTS

| | | | |
|---|---|---|---|
| 2,705,495 A * | 4/1955 | Vrana et al. ............ 604/276 |
| 4,707,906 A * | 11/1987 | Posey ...................... 29/453 |
| 5,106,046 A * | 4/1992 | Rowles et al. ......... 248/311.2 |
| 5,853,158 A * | 12/1998 | Riggle .................... 248/311.2 |
| 7,090,180 B2 | 8/2006 | DiMaggio |
| 7,793,905 B2 * | 9/2010 | Merritt et al. .......... 248/315 |
| 7,938,810 B2 * | 5/2011 | Spranza et al. ........... 604/264 |
| 8,025,275 B2 * | 9/2011 | Wong ........................ 269/6 |
| 2001/0032915 A1 * | 10/2001 | Clifford ................. 248/311.2 |
| 2002/0109062 A1 * | 8/2002 | Fowler ................... 248/311.2 |
| 2002/0179794 A1 * | 12/2002 | Yang ...................... 248/311.2 |
| 2005/0247346 A1 | 11/2005 | Pentz |
| 2007/0045496 A1 * | 3/2007 | Kane ...................... 248/313 |

* cited by examiner

*Primary Examiner* — Alfred J Wujciak
(74) *Attorney, Agent, or Firm* — Aileen Champion Addessi

(57) ABSTRACT

A multi-use support or clamping device and method for supporting at least one hose is mountable to a fixture, such as a sink, toilet, or other waste receptacle, for facilitating discharge of a liquid waste directly into the waste receptacle. The multi-use clamping device includes a clamp, a hose support, an attachment mechanism, and an anchoring mechanism. The clamp is removably securable to the waste receptacle or other fixture. The hose support is an elongated cylindrical member having a bore therethrough sized for disposition of at least one hose, such as a dialysis hose, a cable, tubing, or any other elongated piece of material. The anchoring mechanism may be a U-shaped bracket, a plurality of castellation or slots, a spring mechanism, Velcro, a bladder, or any other suitable type of anchoring device for securely holding the hose.

15 Claims, 3 Drawing Sheets

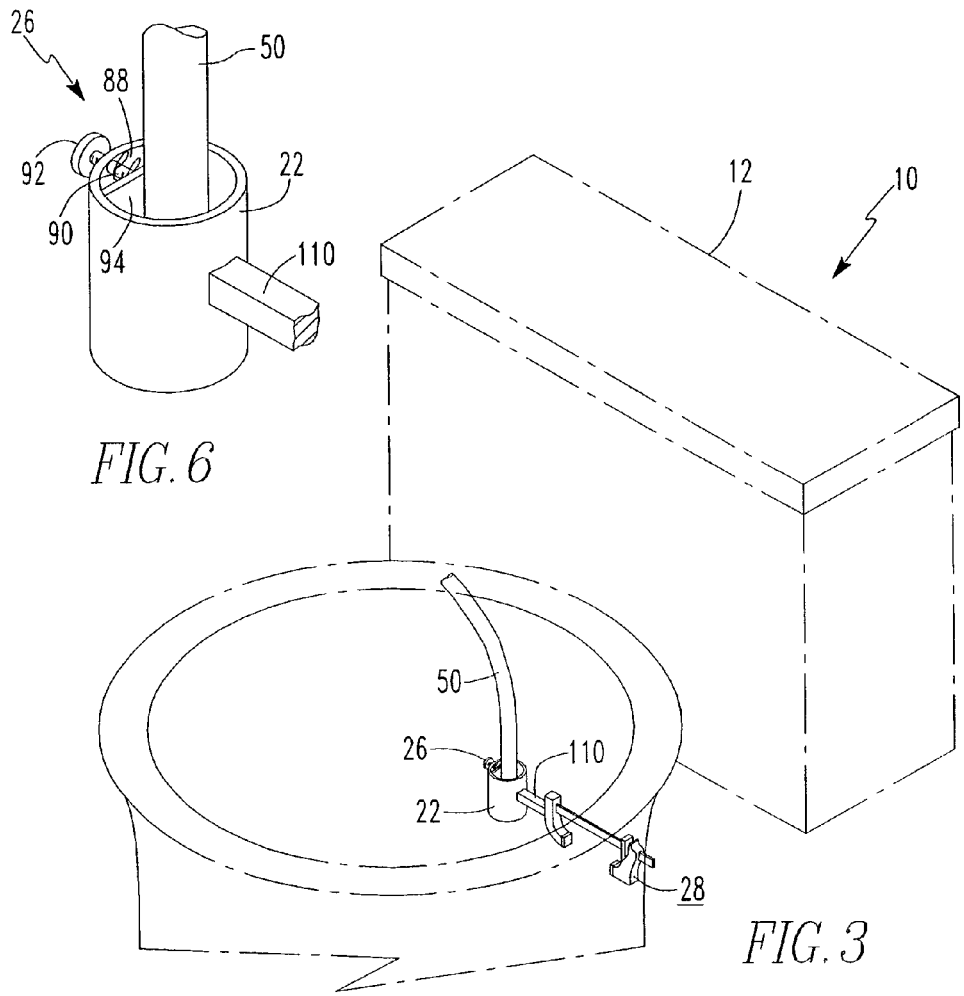
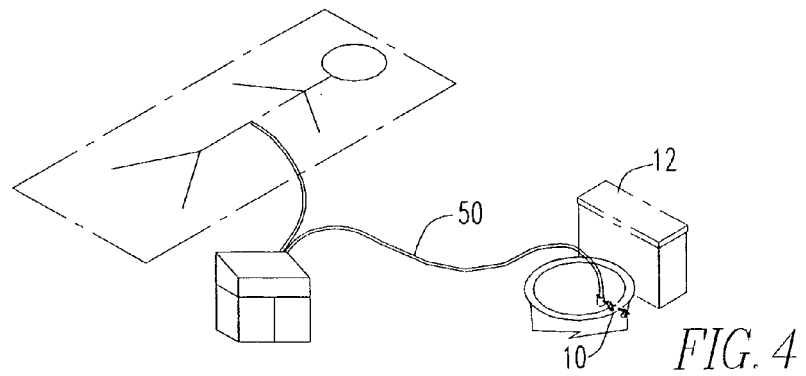

MULTI-USE CLAMPING DEVICE

BACKGROUND OF THE INVENTION

The invention relates to a clamping device and method and, more particularly, to a clamping device which can be fastened quickly and securely to many types of fixtures for the purpose of holding and controlling hoses, such as those used to discharge medical waste fluids into fixtures in a sanitary manner.

This invention can be utilized in any circumstance in which a person is trying to control hoses or cables, including, but not limited to use in the medical field. Every day a large number of dialysis procedures are performed in the hospital or sub-acute setting. Dialysis is a medical procedure performed on patients whose kidneys are not functioning properly or at all. Kidney failure results in a build up of wastes within the human body which can seriously endanger the health of a person or be life threatening. Dialysis technology, which is a medically administered process utilizing complex machinery, replicates the function of kidneys by external means and has developed into two types of treatment: Hemodialysis and Peritoneal dialysis.

Hemodialysis is the more common process utilized and involves circulating a patients blood outside of the body through a membrane filter via a medical machine which cleans the blood of wastes and returns the blood to the patient. The machine which is used to filter or treat a patients blood is called a hemodialysis instrument machine. During this process, the machine emits a waste fluid which needs to be safely controlled and disposed of properly. This fluid is conveyed via hoses to a waste receptacle, namely, a suitable sink, toilet, or combination thereof.

The other type of treatment, called peritoneal dialysis, uses the patients own membrane, which is called a peritoneal membrane, as a filter. The peritoneal membrane is a semi-permeable membrane similar to a sac which is located in a persons abdomen area. This membrane allows waste particles to permeate it, but prevents larger blood cells to permeate the membrane. In Peritoneal dialysis, a patient has a catheter surgically implanted into the abdominal wall which is used to transmit necessary fluids into a persons abdomen for the purpose of filtering the blood and is used to transmit waste fluids from the body to a suitable waste receptacle such as a suitable sink, toilet, or combination thereof.

Although both methods offer distinct advantages and disadvantages depending on individual patient circumstances, either method will generate waste fluids which need to be controlled and disposed of in a sanitary way. These fluids can contain pathogenic microorganisms including but not limited to: Hepatitis b, c, d viruses, HIV viruses, and potentially to a variety of aerobic and anaerobic bacteria. Spilling of such fluids can contaminate and infect floors, medical equipment, and fixtures. Not only is this unsanitary, but also poses a health risk to other patients and medical personnel. The potential for the spread of disease is profound. These infectious materials can lie dormant or be absorbed into other materials and later transmitted to other areas or people posing a significant health threat. Labor is diverted to clean up and control spills and relations between purveyors of the service and recipients can be strained.

Various solutions have been offered to assist in controlling medical waste hoses. For example, U.S. Pat. No. 7,090,180 to DiMaggio presents a waste assembly apparatus utilizing a suction cup for mounting. But with a myriad of designs, shapes, and sizes of bathroom fixtures, there may not be an adequate flat mounting surface in all settings. Also, depending on the weight and angle of the discharge hoses, variable amounts of torque would be applied to the mounting apparatus which could cause the suction cup to become disengaged. Also, suction cups can lose suction when circumstances are not ideal causing failure of the mechanism.

Another apparatus is proposed in U.S. Patent Application No. 2005/0247346 to Pentz entitled "Hose Mount" presents a hose mounting fixture. This fixture, while allowing the operator to hang a hose from a suitable surface such as an attic rafter, does not offer the ability to secure and control hoses adequately to such fixtures like sinks, toilets, and the like. The invention does not offer the ability to quickly and securely mount the unit, and the hoses are not secured in a specific direction at a specific point. This would be problematic in a medical waste discharge situation whereby the discharge hoses would need to be secured in a controlled manner spatially in order to prevent spillage.

Therefore, what is needed is an apparatus and method for quickly and securely mounting hoses or cables to a multitude of surfaces and one which the risk of failure is extraordinarily low due to the health risks associated with a failure. The present invention eliminates the drawbacks associated with prior art and provides a new and alternative apparatus which can be used to quickly attach to a multitude of surfaces and offers a secure mounting mechanism which is unlikely to disengage when mounted and offers the user a means to securely hold hoses or cables in a secure way to prevent their disengagement during use.

SUMMARY OF THE INVENTION

A multi-use support device that is attachable to a fixture for supporting at least one hose includes a hose support attachable to the fixture for supporting the at least one hose within the fixture, and an anchoring mechanism coupled to the hose support for engagement with the at least one hose for securely holding the at least one hose to the hose support. The multi-use clamping device may further include a clamp and an attachment mechanism attached to the clamp and to the hose support for securing together the clamp and the hose support.

The clamp may be any type of clamping device. The hose support may be an elongated cylindrical member having a bore therethrough for disposition of the hoses therethrough. The anchoring mechanism may include at least one bracket, a plurality of U-clips, a strap, a series of castellations or slots, a spring mechanism, fibrous adhesive patches, a bladder, or any other suitable type of anchoring device.

A method of discharging a liquid into a waste receptacle includes the steps of attaching a multi-use support device having a hose support to a fixture, anchoring at least one hose to the hose support for securely holding the at least one hose to the hose support, and discharging the liquid through the at least one hose and into the waste receptacle.

The method may further include the steps of positioning a first frame and a second frame of a clamp of the multi-use support device onto the fixture, disposing the at least one hose within a bore of the hose support, and engaging the at least one hose within an anchoring mechanism attached to the hose support for anchoring the at least one hose with the hose support.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 3 is a perspective view of another alternative embodiment of the multi-use clamping device, mounted on a rim of a toilet, and having an extension;

FIG. 4 is a view illustrating positioning of the multi-use clamping device on a rim of a toilet and connected to a drainage hose of a medical treatment apparatus;

FIG. 6 is an enlarged perspective view of the multi-use clamping device illustrated in FIG. 3;

DESCRIPTION OF THE PREFERRED EMBODIMENT

The invention described herein provides an apparatus for quickly and securely mounting one or several hoses to a multitude of various types and shapes of surfaces for the purpose of holding the hoses in a fixed position for a temporary amount of time, and a method of discharging a liquid into a waste receptacle using the apparatus.

Figure 1:
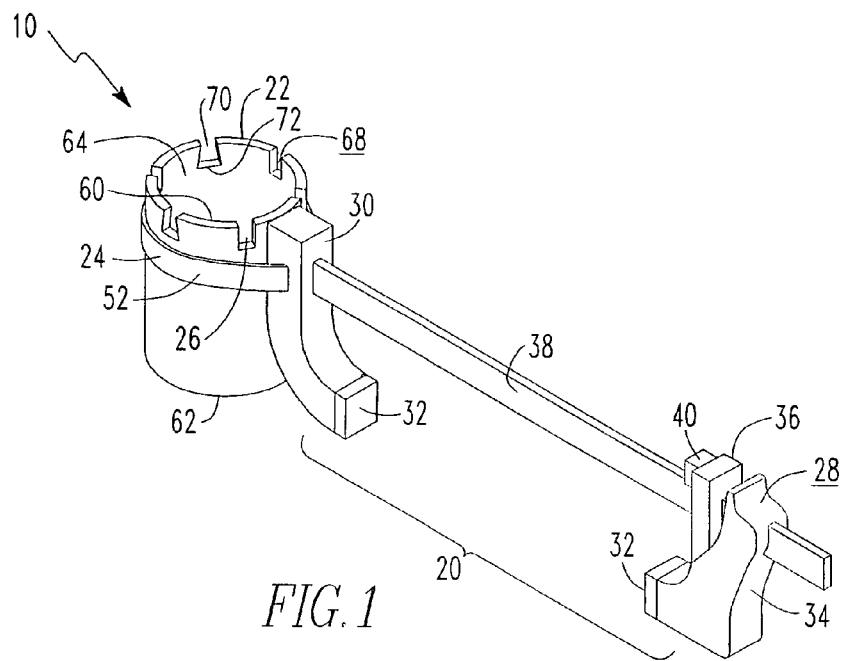
FIG. 1 is a perspective view of a multi-use clamping device.
Figure 2:
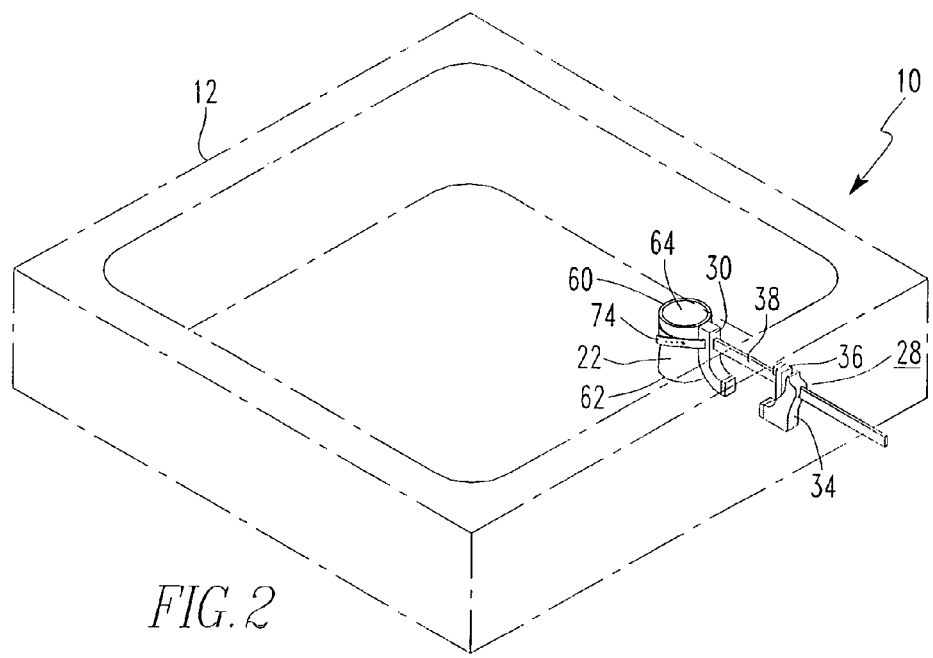
FIG. 2 is a perspective view of an alternative embodiment of the multi-use clamping device mounted on a sink.

Referring to FIGS. 1-4, a multi-use support or clamping device 10 includes a clamp 20, a hose support 22, an attachment mechanism 24, and an anchoring mechanism 26. The clamp 20 may be any suitable type of clamping device. As an example, the clamp 20 is a ratchet type clamping device with protective pads which can be mounted and released quickly without damaging any surface onto which it is mounted. The clamping device may be mounted vertically, horizontally, or in any angular position depending upon surfaces available for mounting in various locations. The multi-use support device 10 can be attached to a fixture 12, such as a sink as illustrated in FIG. 2, a toilet as illustrated in FIG. 3, or any other desired location.

Referring to FIG. 1, as one example, the clamp 20 is composed of a first frame 30 with a pad 32, such as a rubber or soft material, for protecting surfaces from damage due to the clamping pressure. The clamp 20 can also have a second frame 34 with a movable ratcheting handle 36 and a rubber or soft material pad 32 for protecting surfaces from damage due to clamping pressure. Located between the first frame 30 and the second frame 34 is a ratchet bar 38 which is fixably attached to the first frame 30 and slidably attached to the second frame 34. The ratchet bar 38 can have slots, grooves, or the like for the purpose of engaging or locking onto the second frame 34 to apply clamping pressure in multiple points. An operator can manipulate a release mechanism 40 attached to the ratcheting handle 36 to adjust the first and second frames 30 and 34 toward one another or away from one another depending on the function of the clamp 20. Alternatively, the clamp 20 may be any suitable type of clamp for holding the multi-use clamping device onto a surface or fixture.

The hose support 22 of the multi-use clamping device 10 is used for the purpose of directing at least one hose 50, such as hoses used during dialysis, hoses used during various types of medical treatments, different types of cables, or any other elongated type of tubing, to a particular location and holding the hoses 50 at that location until the operator desires to move the hoses 50. As illustrated in the figures, the hose support 22 is an elongated cylinder having a first edge 60, a second edge 62, and a bore 64 extending between the first and second edges 60 and 62. The bore 64 is sized for insertion of one or more hoses 50 therethrough or at least partially through for holding and supporting the hoses 50 within the hose support 22. As an alternative, the hose support 22 may have any other suitable shape, may be a clip for clasping the hose, a strap for encircling the hoses, or any other suitable configuration.

The attachment mechanism 24 of the multi-use clamping device 10 attaches the hose support 22 to the clamp 20. Referring to FIG. 1, the attachment mechanism 24 is a strap 52 that is attached to the clamp 20 and encircles the hose support 22. The attachment may be temporary or permanent. As an alternative to the use of a strap 52, the attachment mechanism 24 may be a snap, a clip, a threaded fastening device, Velcro, or any other mechanical type of attaching device, or the attachment mechanism 24 may include welding the components together, the use of adhesive, or any other suitable attaching means.

The anchoring mechanism 26 of the multi-use clamping device 10 is used to anchor the hoses 50 within the hose support 22 to more securely hold the hoses 50 within the hose support 22. As one example of the anchoring mechanism 26, and as illustrated in FIG. 1, the hose support 22 has one or a series of castellations 68 located around the upper edge 60 of the hose support 22. The castellations 68 are used to grip the hoses 50 or cables to the hose support 22 when they are installed into the castellations 68. Preferably, the castellations 68 have a dovetailed shape with a narrower dimension at a open top end 70 and a wider dimension at the bottom closed end 72 of the dovetail which, after installation of the hose 50 into the castellation 68, will not restrict flow through the hose or tube 50, but will prevent the hose or tube 50 from becoming disengaged from the castellation 68. The castellations 68 may be elongated, slotted, or have any other suitable shape for gripping or engaging the hoses 50.

For the various embodiments of this invention, the same reference characters will be used to designate like parts. In addition, like functions and like interactions of the parts among the various embodiments of this invention will not be repeated for each embodiment.

Alternative embodiments of this invention comprise the multi-use clamping device 10 employing various anchoring mechanisms 26. An alternative embodiment of the anchoring mechanism 26 being castellation 68 is the anchoring mechanism being a strap 74 as shown in FIG. 2. The strap 74 is adjustable and the hose support 22 is flexible so that a tightening of the strap 74 will somewhat collapse the hose support 22 applying an amount of pressure to adequately grip the hoses 50 within the hose support 22 and preventing movement of the hoses 50 without restricting flow through the hoses or tubes 50.

Figure 5:
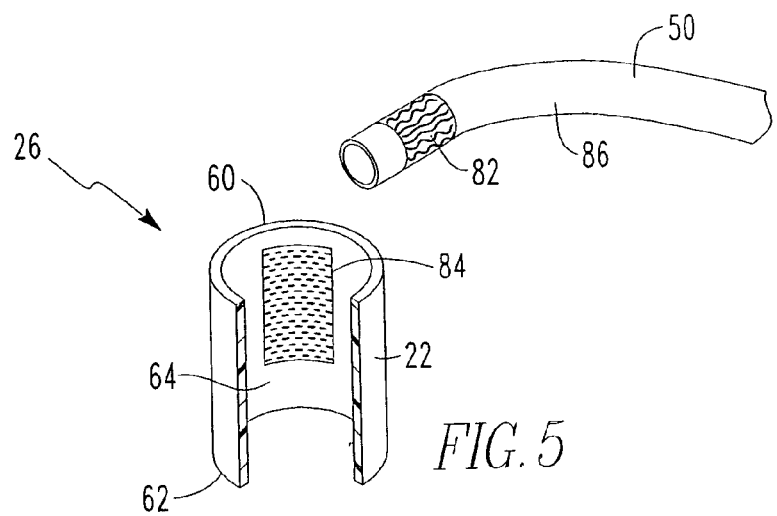
FIG. 5 is a perspective view of an alternative embodiment of the multi-use clamping device.

Referring to FIG. 5 and using the same reference characters to define like parts, another alternative embodiment of the anchoring mechanism 26, as illustrated in FIGS. 1 and 2, may be an anchoring mechanism 26 using fibrous adhesive patches marketed under the tradename of Velcro. One of the fibrous adhesive patches is a loop fastener 82 and the other of the fibrous adhesive patches is a hooked fastener 84. The Velcro patches 82 and 84 can be either temporarily or permanently secured to the hoses or cables 50. One of the fibrous adhesive patches is secured to the hose 50, and the other of the fibrous adhesive patches is secured within the bore 64 of the hose support 22. When a hose 50 having the Velcro patch 82 or 84 is positioned within the hose support 22, the two fibrous adhesive patches are attached together for securing or anchoring together the hoses or cables 50 and the hose support 22.

The Velcro patches 82 and 84 may partially cover the bore 64 of the hose support 22 and an outside surface 86 of the hose support, or preferably, may completely encircle at least a portion of the bore 64 and of the outside surface 86 for providing an adequate area of fibrous patches for quickly and efficiently attaching the two patches 82 and 84 together.

Yet another alternative embodiment of the anchoring mechanism 26 is illustrated in FIG. 6. The anchoring mechanism 26 may be a spring mechanism 88. As one example, the spring mechanism 88 includes a handle 92 coupled to a wall 94 to engage and disengage a slight mechanical pressure of a spring 90. The wall 94 is a piston, movable wall, spring tensioner or other movable component, that contacts the hoses 50 positioned within the hose support 22 to hold the hoses 50 in place. The handle 92 can be grasped by an operator to move the wall 94 or other movable component against the hoses 50 to anchor or hold the hoses 50 within the hose support 40 during use of the multi-use clamping device 10. The operator can adjust the handle 92 again to move the wall 94 away from the hoses 50 to loosen the pressure against the hoses 50 so that the hoses 50 can be removed from the hose support 22. Alternatively, the spring 90 of the spring mechanism 88 may be biased to extend outwardly and press against the hose 50. In which case, an operator would pull the spring mechanism 88 to release the pressure exerted by the spring mechanism 88 against the hose 50 for removing the hose 50 from the hose support 22.

Figure 7:
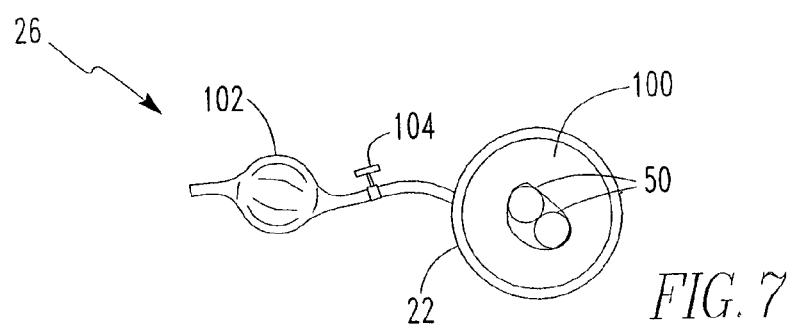
FIG. 7 is a perspective view of another alternative embodiment of the multi-use clamping device.

As yet another alternative, referring to FIG. 7, the anchoring mechanism 26 includes at least one internal pneumatic bladder 100 that is positioned within the hose support 22. The bladder 100 is attached to a hand pump 102 and a valve 104 for applying pneumatic pressure via the hand pump 102. After the hoses 50 are disposed within the hose support 22, the bladder 100 is expanded to hold and secure the hoses 50 therein. The bladder 100 can be partially expanded, allowing the bladder to partially fill the bore circumferentially wherein the volume occupied by a hose or hoses will cause a distortion of bladder radially. Once the operator desires to remove the hoses 50, the pneumatic pressure can be released via the valve 104 releasing the grip of the bladder 100 upon the hoses, cables, tubes 50 or the like.

Figure 8:
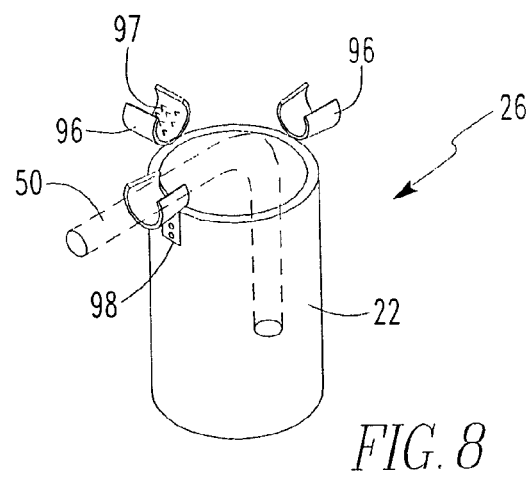
FIG. 8 is a perspective view of yet another alternative embodiment of the multi-use clamping device.

Alternatively, and referring to FIG. 8, the anchoring mechanism 26 includes at least one bracket, such as a U-clip 96 or the like, attached to at least one edge 60 or 62 of the hose support 22 for the purpose of attaching the hose 50 onto the brackets 96 to secure the hoses or cables 50 onto the clamping device 10. Preferably, several U-clips 96 are used for enabling several hoses 50 to be secured simultaneously within the hose support 40. Also, depending on the orientation of the medical equipment and the multi-use clamping device 10, by using a plurality of U-clips 96 provides various positions for locating the hoses 50 within the hose support 22 for efficiently and easily securing the hoses 50 within the hose support 22. The U-clip 96 may contain certain projections 97, possibly tapered, or other means, such as fimbriae, fingerlike, or corrugations at any angulation, or material to enhance friction about the internal surface of the arc subtended by the U-clip 96. The projections 97 may be positioned in a bore of the U-clip 96 or in any other suitable location. The U-clip 96 may be tapered, straight, or have any other desired shape for holding the hoses 50. The U-clip 96 may be pivotally attached to the hose support 22, may be orthogonally positioned with respect to the hose support 22, may bend or pivot outwardly when the hose 50 is positioned therein, may be biased to bend or pivot inwardly when the hose 50 is removed from the U-clip or bracket 96, or may have any other desired positioning for facilitating support of the hoses 50. The U-clip 96 may be attached by a bracket 98, may be integrally formed with the hose support 22, adhesively attached, welded, or attached by any other means. The bracket 98 may include a hinge or other pivoting mechanism for allowing the U-clip 96 to pivot axially in an x-y or x-z plane, or to pivot or rotate in a single or a plurality of directions with respect to the hose support 22.

Referring to FIG. 3, the multi-use clamping device 10 may further include an extension 110 attached between the clamp 20 and the hose support 22 for the purpose of extending the hose support 22 away from the first frame 30. It may be desirous in some circumstances to have the hose support 22 extended away from the clamp 20. The extension 110 may be a bracket, an elongated piece of material, or any other desired shape for positioning the hose support 22 in spaced apart relationship to the clamp 20.

The second edge 62 of the hose support 22 may be positioned at any sufficient height with respect to the fixture, but preferably, the second edge 62 is located above the height of the fixture for substantially preventing the discharging fluid positioned in the fixture from backing up into the hoses 50 during the procedure. As an example, the extension 110 can be designed to support the hose support 22 in any suitable position. Additionally, the clamp 20 may be designed to position the second edge 62 of the hose support 22 above the height of the fixture to prevent contact of fluid in the fixture with the hose or hoses 50.

To operate the multi-use clamping device 10, an operator must locate an adequate disposal fixture 12, such as a sink or toilet. The operator, after locating an adequate fixture 12, places the clamp 20 of the multi-use clamping device 10 onto the fixture 12 and applies pressure via the ratcheting mechanism 28 for securing the clamp 20 onto the fixture 12. The operator then installs the necessary hoses 50 into or onto the hose support 22, depending on the embodiment utilized. The hose 50 is engaged with the anchoring mechanism 26. The multi-use clamping device 10 will remain fixed upon the temporary mounting surface or fixture 12 until the operator desires to remove the unit, which is done by first removing the hoses or cables 50 and then, disengaging the clamping pressure from the clamp 20 by actuating the release mechanism 40.

A method of discharging a liquid into a waste receptable using the multi-use support device 10 includes attaching the multi-use support device to a fixture, anchoring the hose to the hose support for securely holding the hose to the hose support, and discharging the liquid through the hose and into the waste receptable. The method further includes attaching a clamp to the fixture, and anchoring the hose within an anchoring mechanism.

Several advantages of the multi-use clamping device 10 include the ability of the device to be applied to various surfaces. In addition, the multi-use clamping device 10 can be employed quickly, minimizing labor times required during setup. Also, the device provides for a more secure means of securing hoses or cables 50 than prior art. Because a failure could pose serious health consequences to the public, securing hoses or cables 50 with the absolute minimal risk of failure is of the utmost importance. Securing hoses or cables 50 via mechanical means in a specific point rather than suction, tape, or the like offers distinct advantages.

Another advantage is that the device would also comply with adherence to local or state plumbing and/or building codes or, in the absence thereof, to national plumbing standards.

Another advantage is the use of the anchoring mechanism 26, which more securely holds the hoses 50 to the hose support 22, substantially preventing spillage of the waste. Yet another advantage is that the multi-use support device 10 can be used to support various types of hoses 50, including but not limited to, cables, tubing or the like, for different applications and procedures.

Therefore, the invention provides an apparatus and method for quickly and securely mounting hoses 50 to a multitude of various surfaces or fixtures 12 for a temporary or fixed amount of time.

Thus there has been shown and described a novel multi-use clamping device and method which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A multi-use support device attachable to a fixture for supporting at least one hose, comprising:
    a hose support positionable for supporting the at least one hose;
    a first frame coupled to the hose support and to the fixture;
    a second frame positioned in spaced apart relationship to and cooperable with the first frame;
    a ratchet bar extending between the first and the second frame, the ratchet bar fixedly attached to the first frame and slidably attached to the second frame;
    a ratcheting handle attached to the second frame for moving the second frame with respect to the first frame for providing clamping pressure between the first and second frames to the fixture; and
    an anchoring mechanism coupled to the hose support and engagable with the at least one hose for securely holding the at least one hose to the hose support, the anchoring mechanism having at least one castellation positioned in the hose support, the at least one castellation sized for engagement with the at least one hose while the at least one hose is supported by the hose support.

2. The multi-use support device according to claim 1, further comprising the first and second frames removably mountable with the fixture for supporting the multi-use support device on the fixture.

3. The multi-use support device according to claim 1, further comprising:
    the hose support having a bore; and
    the anchoring mechanism including a first and a second fibrous adhesive patch, one of the first and second fibrous adhesive patches attachable to the at least one hose, and the other of the first and second fibrous adhesive patches attachable to the bore of the hose support, the first and second fibrous adhesive patches engagable with one another for securing the at least one hose to the hose support.

4. The multi-use support device according to claim 1, wherein the anchoring mechanism includes at least one bracket attached to the hose support, the at least one bracket sized for engaging the at least one hose while the at least one hose is disposed within the hose support.

5. A multi-use clamping device attachable to a fixture for supporting at least one hose, comprising:
    a clamp attachable to the fixture for removably securing the multi-use clamping device to the fixture, the clamp including a first frame, a second frame, a ratchet bar, and a ratcheting handle;
    a hose support coupled to the at least one hose for supporting the at least one hose;
    the first frame coupled to the hose support;
    the second frame positioned in spaced apart relationship to and cooperable with the first frame;
    the ratchet bar extending between the first and the second frame, the ratchet bar fixedly attached to the first frame and slidably attached to the second frame;
    the ratcheting handle attached to the second frame for moving the second frame with respect to the first frame for providing clamping pressure between the first and second frames to the fixture; and
    an anchoring mechanism coupled to the hose support and engagable with the at least one hose for securely holding the at least one hose to the hose support.

6. The multi-use clamping device according to claim 5, further comprising an attachment mechanism coupled to the clamp and to the hose support for securing the clamp and the hose support together.

7. The multi-use clamping device according to claim 5, wherein the anchoring mechanism includes at least one bracket attached to the hose support, the at least one bracket sized for engaging the at least one hose while the at least one hose is disposed within the hose support.

8. The multi-use clamping device according to claim 7, wherein the at least one bracket is a U-clip pivotally attached to the hose support for engaging the at least one hose.

9. The multi-use clamping device according to claim 5, wherein the anchoring mechanism includes at least one castellation positioned in the hose support, the at least one castellation sized for engagement with the at least one hose while the at least one hose is supported by the hose support.

10. The multi-use clamping device according to claim 9, wherein the at least one castellation has a dovetail shape for securely holding the at least one hose within the at least one castellation.

11. The multi-use clamping device according to claim 5, wherein the anchoring mechanism comprises a wall movably attached to the hose support and contactable with the at least one hose for applying pressure to the at least one hose while at least one hose is supported by the hose support.

12. The multi-use clamping device according to claim 5, further comprising:
    the hose support having a bore; and
    the anchoring mechanism including a first fibrous adhesive patch and a second fibrous adhesive patch, one of the first and second fibrous adhesive patches attachable to the at least one hose, and the other of the first and second fibrous adhesive patches attachable to the bore of the hose support, the first and second fibrous adhesive patches engagable with one another for securing the at least one hose to the hose support.

13. The multi-use clamping device according to claim 5, further comprising:
    the hose support having a bore; and
    the anchoring mechanism including at least one bladder positioned within the bore of the hose support, the at least one bladder expandable within the hose support while the at least one hose is disposed within the hose support for containing the at least one hose within the at least one bladder for securing the at least one hose to the hose support.

14. The multi-use clamping device according to claim 5, further comprising an extension attached to the hose support and to the clamp for positioning the hose support in a spaced apart relationship to the clamp.

15. The multi-use clamping device according to claim 5, wherein the hose support has a first edge and a second edge, the second edge of the hose support positioned at a sufficient height with respect to the future for discharging a liquid through the at least one hose and into the fixture.

* * * * *